(12) United States Patent
Choi et al.

(10) Patent No.: US 11,545,923 B2
(45) Date of Patent: Jan. 3, 2023

(54) MOTOR DRIVING APPARATUS AND METHOD

(71) Applicants: Hyundai Motor Company, Seoul (KR); KIA CORPORATION, Seoul (KR)

(72) Inventors: Ho Rim Choi, Changwon-si (KR); Han Hee Park, Hwaseong-si (KR); Seong Min Kim, Changwon-si (KR); Seon Mi Lee, Anyang-si (KR); Ho Sun Jang, Chungcheongnam-do (KR); Tae Il Yoo, Anyang-si (KR); Seung Hyeon Bin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/382,898

(22) Filed: Jul. 22, 2021

(65) Prior Publication Data

US 2022/0173687 A1 Jun. 2, 2022

(30) Foreign Application Priority Data

Nov. 27, 2020 (KR) .................. 10-2020-016243 8

(51) Int. Cl.
*H02P 27/08* (2006.01)
*H02P 21/14* (2016.01)
(Continued)

(52) U.S. Cl.
CPC ............. *H02P 27/08* (2013.01); *H02P 6/28* (2016.02); *H02P 21/141* (2013.01); *H02P 21/20* (2016.02); *H02P 23/14* (2013.01); *H02P 25/22* (2013.01)

(58) Field of Classification Search
CPC .......... H02P 27/00; H02P 27/04; H02P 27/06; H02P 27/08; H02P 27/085; H02P 27/12; H02P 21/00; H02P 21/0021; H02P 21/0085; H02P 21/02; H02P 21/04; H02P 21/08; H02P 21/10; H02P 21/12; H02P 21/14; H02P 21/141; H02P 21/22; H02P 21/26; H02P 21/28; H02P 21/30; H02P 23/00; H02P 23/07; H02P 23/14; H02P 23/0027; H02P 25/00; H02P 25/022; H02P 25/062;
(Continued)

(56) References Cited

U.S. PATENT DOCUMENTS 11,196,372 B2 * 12/2021 Kinjo .................... H02P 21/22
2009/0033253 A1 2/2009 Nagashima et al.

FOREIGN PATENT DOCUMENTS

JP 6285256 B2 2/2018

* cited by examiner

*Primary Examiner* — Antony M Paul
(74) *Attorney, Agent, or Firm* — Morgan, Lewis & Bockius LLP

(57) ABSTRACT

A motor driving apparatus may include a first inverter circuit including a plurality of first switching devices and connected to a first end portion of each of a plurality of windings in a motor corresponding to a plurality of phases of the motor, respectively, a second inverter circuit including a plurality of second switching devices and connected to a second end portion of each of the plurality of windings, and a plurality of selection switching devices having first end portions connected to a node to which the plurality of windings and the plurality of second switching devices are connected and second end portions connected to each other.

16 Claims, 10 Drawing Sheets

(51) Int. Cl.
*H02P 23/14* (2006.01)
*H02P 6/28* (2016.01)
*H02P 21/20* (2016.01)
*H02P 25/22* (2006.01)

(58) Field of Classification Search
CPC .... H02P 25/18; H02P 6/00; H02P 6/08; H02P 6/28; H02P 1/00; H02P 1/04; H02P 1/42; H02P 1/46; H02P 3/12; H02P 3/14
See application file for complete search history.

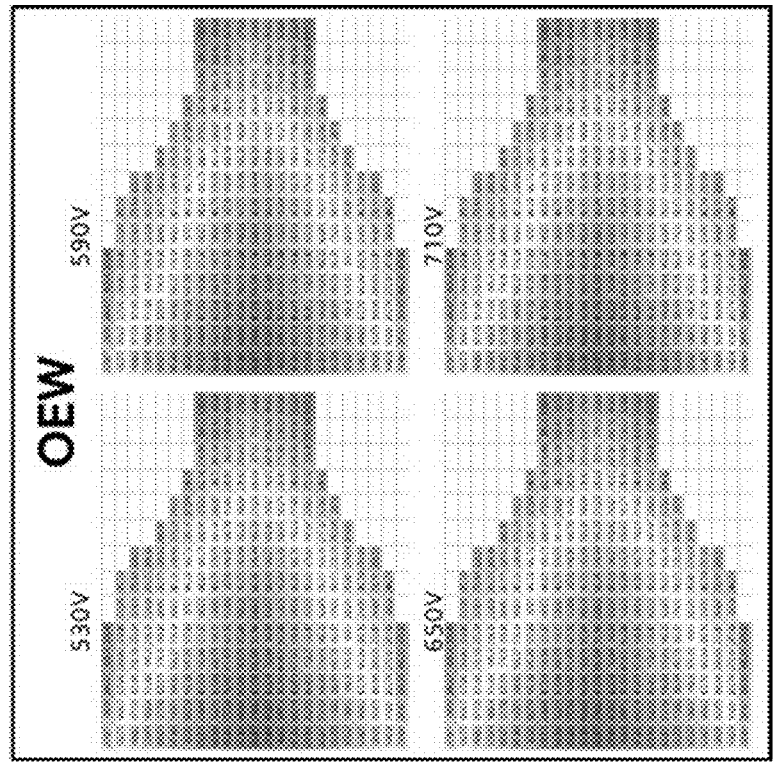
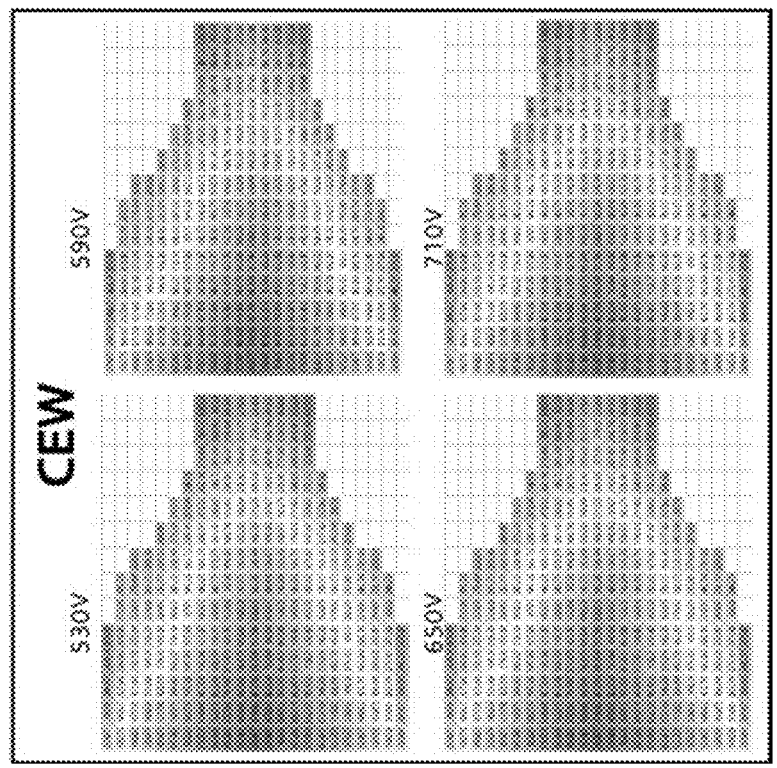
FIG. 5

MOTOR DRIVING APPARATUS AND METHOD

CROSS-REFERENCE TO RELATED APPLICATION

The present application claims priority to Korean Patent Application No. 10-2020-0162438, filed on Nov. 27, 2020, the entire contents of which is incorporated herein for all purposes by this reference.

BACKGROUND OF THE INVENTION

Field of the Invention

The present invention relates to a motor driving apparatus, and more particularly to a motor driving apparatus and method for converting a driving mode into one of a Y-connection motor driving mode and an open end winding motor driving mode according to required output of the motor and driving the motor.

Description of Related Art

In general, a motor is driven by generating phase voltages of the motor and providing the phase voltages to the motor through pulse width modulation control of a plurality of switching devices corresponding to a plurality of phases, included in an inverter.

In general, a winding of each phase included in a motor has a circuit forming Y-connection by connecting one-side ends thereof to an inverter and connecting the other-side ends thereof to each other.

When the motor having the Y-connected winding is driven, torque is generated by applying a line-to-line voltage to the Y-connected winding of the motor to generate alternating current (AC) while a switching device in the inverter is turned on/off through pulse width modulation control.

The motor configured with the Y-connected winding has a problem in that, as the number of coils of the motor increases to increase the maximum torque of the motor, a section having high-voltage utilization efficiency becomes far from a low-torque region as a main operation point of a vehicle and fuel efficiency is degraded. Furthermore, in terms of fuel efficiency of a vehicle using a motor, when a main operation point is designed to be contained in a section having high-voltage utilization efficiency, there is a problem in that vehicle acceleration start performance is degraded due to a restriction in the maximum torque of the motor.

To overcome the problem of such a motor driving method of the Y-connected winding structure, a method of driving the motor using two inverters by connecting a one-side end of a winding of each phase of the motor to the other inverter rather than using Y-connection is proposed. The motor driving method is referred to as an open end winding-type driving because opposite-side ends of a winding corresponding to each phase in the motor are connected to respective different inverters and have open types.

A proposal has been provided for a technology of selectively using a mode in which a winding of a motor forms Y-connection by short-circuiting a selection switching device depending on required output and only one inverter is driven or a mode in which the selection switching device is open to open the winding of the motor and two inverters are driven by further using the selection switching device for connecting one-side ends of windings of the motor.

When the two motor driving modes are selectively used, it is necessary to set an appropriate reference for selecting a driving mode, and a driving method for appropriately driving a motor based on the set reference is also required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a motor driving apparatus and method for determining a winding of the motor to be in Y-connection or open state, appropriately determining one driving mode among two driving modes, and driving the motor.

Various aspects of the present invention are directed to providing a method of making a reference data map for determining a winding of the motor to be in Y-connection or open state, driving the motor, and appropriately determining one driving mode among two driving modes.

In accordance with an aspect of the present invention, the above and other objects may be accomplished by the provision of a motor driving apparatus including a first inverter circuit including a plurality of first switching devices and connected to a first end portion of each of a plurality of windings in a motor corresponding to a plurality of phases of the motor, respectively, a second inverter circuit including a plurality of second switching devices and connected to a second end portion of each of the plurality of windings, a plurality of selection switching devices having first end portions connected to a node to which the plurality of windings and the plurality of second switching devices are connected and second end portions connected to each other, and a controller electrically connected to the plurality of first switching devices, the plurality of second switching devices and the plurality of selection switching devices and configured to drive the motor in one driving mode among a first driving mode in which the plurality of selection switching devices is turned on by the controller and the first switching device is controlled by the controller to drive the motor and a second driving mode in which the plurality of selection switching devices is turned off by the controller and the first switching device and the second switching device are controlled by the controller to drive the motor, and to determine the driving mode based on an inverse magnetic flux value and a torque command of the motor.

The controller may include an output map applied to each of the first driving mode and the second driving mode, and the output map may store torque depending on a rotation speed of the motor for each voltage of a battery that stores electric power of the motor.

The controller may be configured to generate the torque command of the motor by applying the voltage of the battery, the rotation speed of the motor, and a driver input to the output map.

The controller may include a data map for determining a driving mode according to the inverse magnetic flux value and the torque command of the motor and may determine a driving mode of the motor according to a region corresponding to the inverse magnetic flux value and the torque command of the motor in the data map for determining the driving mode.

The controller may be configured to determine an inverse magnetic flux of the motor based on the rotation speed of the motor configured for each voltage of the battery that stores the electric power of the motor, and may determine the driving mode of the motor by applying the determined inverse magnetic flux of the motor and the torque command of the motor to the data map for determining the driving mode.

The data map for determining the driving mode may be a data map configured by deriving a loss of the motor in advance according to relationship between rotation speed and torque of the motor in each driving mode for each of a plurality of voltages of the battery that stores the electric power of the motor, determining a driving mode having a smaller loss in advance among losses of relationship between rotation speed and torque of the motor that correspond to each other as a driving mode in a corresponding motor rotation speed-torque, deriving a boundary of a driving mode in the relationship between rotation speed and torque of the motor determined for each voltage of the battery, converting an axis of a motor rotation speed of the boundary into an axis of the inverse magnetic flux, and setting a region for determining the driving mode of the motor according to a reference curve determined by applying a weight to an inverse magnetic flux in each torque for each of a plurality of voltages, summing result values, and connecting representative inverse magnetic fluxes depending on torque.

When the driving mode of the motor is changed, the controller may maintain the changed driving mode of the motor configured for a predetermined reference time and may then determine whether the driving mode of the motor is changed.

In accordance with another aspect of the present invention, the above and other objects may be accomplished by the provision of a motor driving method using a motor driving apparatus including a first inverter circuit including a plurality of first switching devices and connected to a first end portion of each of a plurality of windings in a motor corresponding to a plurality of phases of the motor, respectively, a second inverter circuit including a plurality of second switching devices and connected to a second end portion of each of the plurality of windings, and a plurality of selection switching devices having first end portions connected to a node to which the plurality of windings and the plurality of second switching devices are connected and second end portions connected to each other, the motor driving method including receiving a rotation speed of the motor and a voltage of a battery that stores electric power of the motor, generating a torque command of the motor and determining an inverse magnetic flux value of the motor based on the received rotation speed of the motor and the battery voltage, applying the determined torque command and the inverse magnetic flux value to a preset data map for determining a driving mode and determining one driving mode of the motor from a first driving mode in which the plurality of selection switching devices is turned on by the controller and the first switching device is controlled by the controller to drive the motor and a second driving mode in which the plurality of selection switching devices is turned off by the controller and the first switching device and the second switching device are controlled by the controller to drive the motor, and controlling an on/off state of the plurality of selection switching devices according to the determined driving mode of the motor and controlling the first switching device and the second switching device.

The determining may include determining the torque command using an output map for storing torque depending on a rotation speed of the motor for each voltage of the battery to be applied to the first driving mode and the second driving mode.

The determining may include generating the torque command of the motor by applying the voltage of the battery, the rotation speed of the motor, and a driver input to the output map and generating the torque command of the motor.

The determining may include determining the inverse magnetic flux of the motor according to the rotation speed of the motor for each voltage of the battery that stores the electric power of the motor.

The data map for determining the driving mode may be a data map configured by deriving a loss of the motor in advance according to relationship between rotation speed and torque of the motor in each driving mode for each of a plurality of voltages of the battery that stores the electric power of the motor, determining a driving mode having a smaller loss in advance among losses of relationship between rotation speed and torque of the motor that correspond to each other as a driving mode in a corresponding motor rotation speed-torque, deriving a boundary of a driving mode in the relationship between rotation speed and torque of the motor determined for each voltage of the battery, converting an axis of a motor rotation speed of the boundary into an axis of the inverse magnetic flux, and setting a region for determining the driving mode of the motor according to a reference curve determined by applying a weight to an inverse magnetic flux in each torque for each of a plurality of voltages, summing result values, and connecting representative inverse magnetic fluxes depending on torque.

When the driving mode of the motor is changed, the driving mode of the motor may be determined again by performing the receiving, the determining, and the determining after the changed driving mode of the motor is maintained for a predetermined reference time.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a diagram showing an example in which motor losses are determined according to motor rotation speed and torque for each motor driving mode in a representative voltage of a battery;

Figure 1:
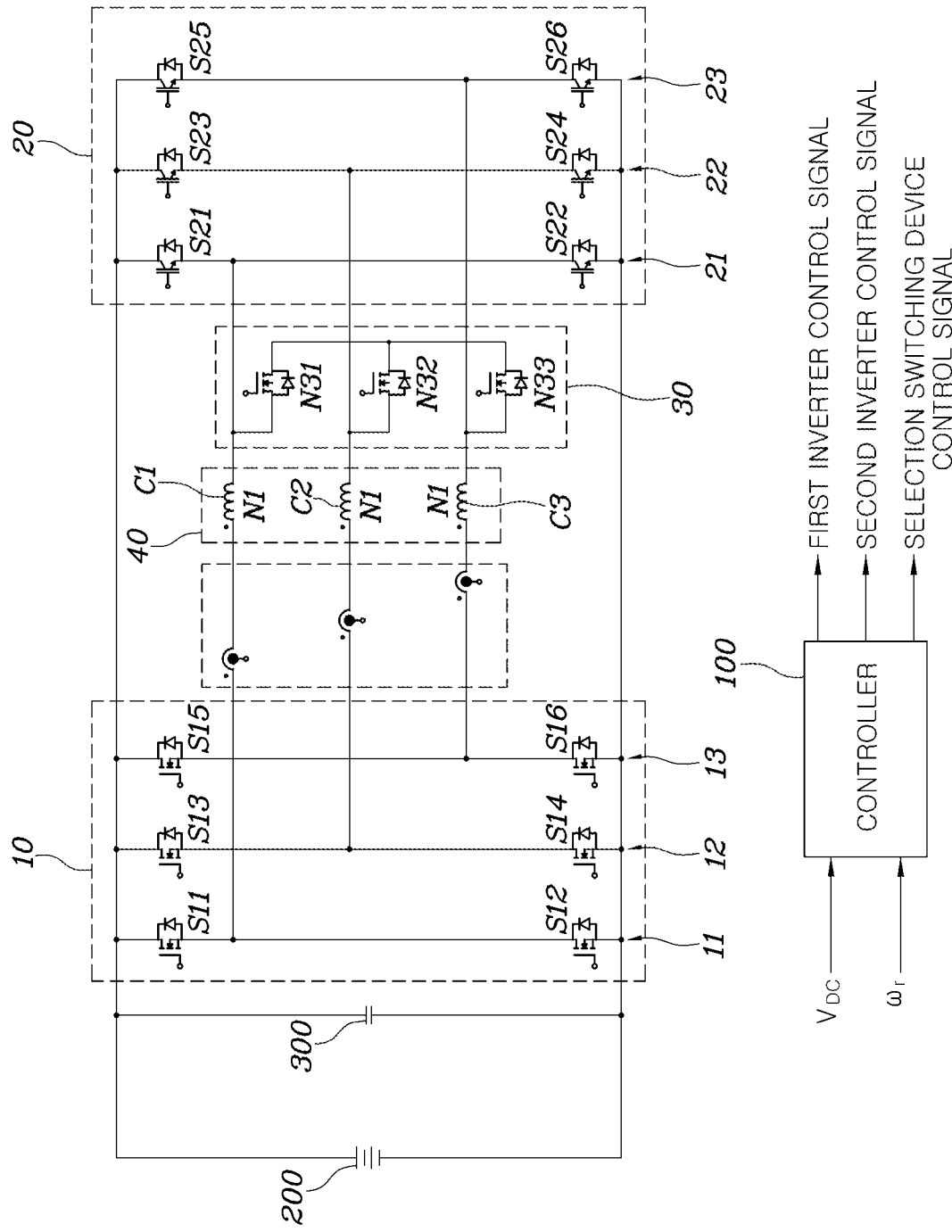
FIG. 1 is a circuit diagram showing a motor driving apparatus according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, a motor driving apparatus and method according to various embodiments of the present invention will be described with reference to the accompanying drawings.

FIG. 1 is a circuit diagram showing a motor driving apparatus according to various exemplary embodiments of the present invention.

Referring to FIG. 1, the motor driving apparatus according to various exemplary embodiments of the present invention may include a first inverter circuit unit 10 including a plurality of first switching devices S11 to S16 and connected to a first end portion of each of windings C1 to C3 of a motor 40, a second inverter circuit unit 20 including a plurality of second switching devices S21 to S26 and connected to a second end portion of each of the windings C1 to C3 of the motor 40, and selection switching devices S31 to S33 having one-side end portions connected to a second end portion of each of the windings C1 to C3 of the motor 40 and a node to which the second switching devices S21 to S26 are connected and the other-side end portions connected to each other.

The first inverter circuit unit 10 and the second inverter circuit unit 20 may convert direct current (DC) stored in a battery 200 into three-phase alternating current (AC) and may provide the converted AC to the motor 40 or may convert regenerative braking energy generated due to generation of regenerative braking torque of the motor 40 during regenerative braking into DC and may provide the converted DC to the battery 200. Such conversion between DC and AC may be performed through pulse width modulation control of the plurality of first switching devices S11 to S16 and the plurality of second switching devices S21 to S26 which are included in the first inverter circuit unit 10 and the second inverter circuit unit 20, respectively.

The first inverter circuit unit 10 may include a plurality of legs 11 to 13 to which a DC voltage formed in a DC-link capacitor 300 connecting opposite-side end portions of the battery 200 therebetween is applied. The legs 11 to 13 may correspond to a plurality of phases of the motor 40, respectively, to achieve electrical connection therebetween.

In more detail, a first leg 11 may include two switching devices S11 and S12 that are connected in series to each other between opposite-side end portions of the DC-link capacitor 300, and a connection node of the two switching devices S11 and S12 may be connected to a one-side end portion of a one-phase winding C1 in the motor 40 to input and output AC power corresponding to one of a plurality of phases.

Similarly, a second leg 12 may include two switching devices S13 and S14 that are connected in series to each other between the opposite-side end portions of the DC-link capacitor 300, and the connection node of the two switching devices S13 and S14 may be connected to a one-side end portion of a one-phase winding C2 in the motor 40 to input and output AC power corresponding to one of a plurality of phases.

A third leg 13 may include two switching devices S15 and S16 that are connected in series to each other between the opposite-side end portions of the DC-link capacitor 300, and the connection node of the two switching devices S15 and S16 may be connected to a one-side end portion of a one-phase winding C3 in the motor 40 to input and output AC power corresponding to one of a plurality of phases.

The second inverter circuit unit 20 may also have a similar configuration to the first inverter circuit unit 10. The second inverter circuit unit 20 may include a plurality of legs 21 to 23 to which a DC voltage formed in the DC-link capacitor 300 connecting the opposite-side end portions of the battery 200 therebetween is applied. The legs 21 to 23 may correspond to a plurality of phases of the motor 40, respectively, to achieve electrical connection therebetween.

In more detail, a first leg 21 may include two switching devices S21 and S22 that are connected in series to each other between opposite-side end portions of the DC-link capacitor 300, and a connection node of the two switching devices S21 and S22 may be connected to the other-side end portion of the one-phase winding C1 in the motor 40 to input and output AC power corresponding to one of a plurality of phases.

Similarly, a second leg 22 may include two switching devices S23 and S24 that are connected in series to each other between the opposite-side end portions of the DC-link capacitor 300, and the connection node of the two switching devices S23 and S24 may be connected to the other-side end portion of the one-phase winding C2 in the motor 40 to input and output AC power corresponding to one of a plurality of phases.

A leg 23 may include two switching devices S25 and S26 that are connected in series to each other between the opposite-side end portions of the DC-link capacitor 300, and the connection node of the two switching devices S25 and S26 may be connected to a one-side end portion of the one-phase winding C3 in the motor 40 to input and output AC power corresponding to one of a plurality of phases.

Among switching devices included in the inverter circuit units 10 and 20, a switching device connected to a high-potential side (+ terminal) of the battery 200 is referred to as a top-phase switching device, and a switching device connected to a low-potential side (− terminal) of the battery 200 is referred to as a bottom-phase switching device.

The first inverter circuit unit 10 may be connected to one-side end portions of the windings C1 to C3 of the motor 40 and the second inverter circuit unit 20 may be connected to the other-side end portions of the windings C1 to C3 of the motor 40. That is, electrical connection may be formed using an open end portion winding method in which the opposite-side end portions of the windings C1 to C3 of the motor 40 are connected to the first inverter circuit unit 10 and the second inverter circuit unit 20, respectively.

According to various exemplary embodiments of the present invention, a selection switching device 30 may include a total of three switching devices S31 to S33, and a one-side end portion of each of the switching devices S31 to S33 may be connected to a node to which the plurality of windings C1 to C3 and the second switching device are connected, and the other-side end portions of the switching devices S31 to S33 may be connected to each other.

In the present connection structure, when the selection switching device 30 is turned off (is open), the opposite-side end portions of the windings C1, C2, and C3 of the motor 40 may be connected to the first inverter circuit unit 10 and the second inverter circuit unit 20, respectively, and the motor 40 may be driven by the open end portion winding structure by driving the first inverter circuit unit 10 and the second inverter circuit unit 20 together. A mode in which the selection switching device 30 is turned off and a winding of the motor 40 is configured with an open end portion winding structure and the two inverter circuit units 10 and 20 are controlled together to drive the motor 40 will be referred to as an open end portion winding (OEW) driving mode.

When the selection switching device 30 is turned on (short-circuited), one-side end portions of the windings C1 to C3 of the motor 40 may be connected to each other to form Y-connection. In the instant case, the motor may be driven using a closed end portion winding structure by driving only the first inverter circuit unit 10 without use of the second inverter circuit unit 20. A mode in which windings of the motor 40 are Y-connected by turning on the selection switching device 30 and only the first inverter circuit unit 10 is controlled to drive the motor 40 will be referred to as a closed end portion winding (CEW) driving mode.

The open end portion winding structure may be configured for driving a high-output motor using the two inverter circuit units. The closed end winding structure may be configured for driving a high-efficiency motor by driving only the first inverter circuit unit 10 to which a high-efficiency switching device (e.g., SiC) is applied. To more efficiently drive a motor and to simultaneously reduce costs consumed to embody the inverter circuit units 10 and 20, a switching device included in the first inverter circuit unit 10 may employ an expensive high-efficiency device (SiC device) as described above, and a switching device included in the second inverter circuit unit 20 may employ an inexpensive device (Si device).

The selection switching devices S31 to S33 may employ various switching devices that are well-known in the art to which various exemplary embodiments of the present invention pertains, such as MOSFET or IGBT.

A controller 100 may receive a battery voltage $V_{DC}$ and a rotation speed $\omega_r$ of the motor 40 and may determine one of an OEW driving mode and a CEW driving mode as a driving mode of the motor 40 based on the received data and may then control the states of the selection switching devices S31 to S33 of the motor 40 and the states of the switching devices S11 to S16 and S21 to S26 in the inverters 10 and 20.

In more detail, the controller 100 may determine an inverse magnetic flux $1/\lambda$ of the motor based on the battery voltage $V_{DC}$ and a required rotation speed $\omega_r$ of the motor 40, may determine a driving mode by applying the determined inverse magnetic flux value to a driving mode determination data map based on a preset relationship between an inverse magnetic flux and torque of the motor, and may determine whether the selection switching devices S31 to S33 and the inverters 10 and 20 are controlled depending on the determined driving mode.

Figure 2:
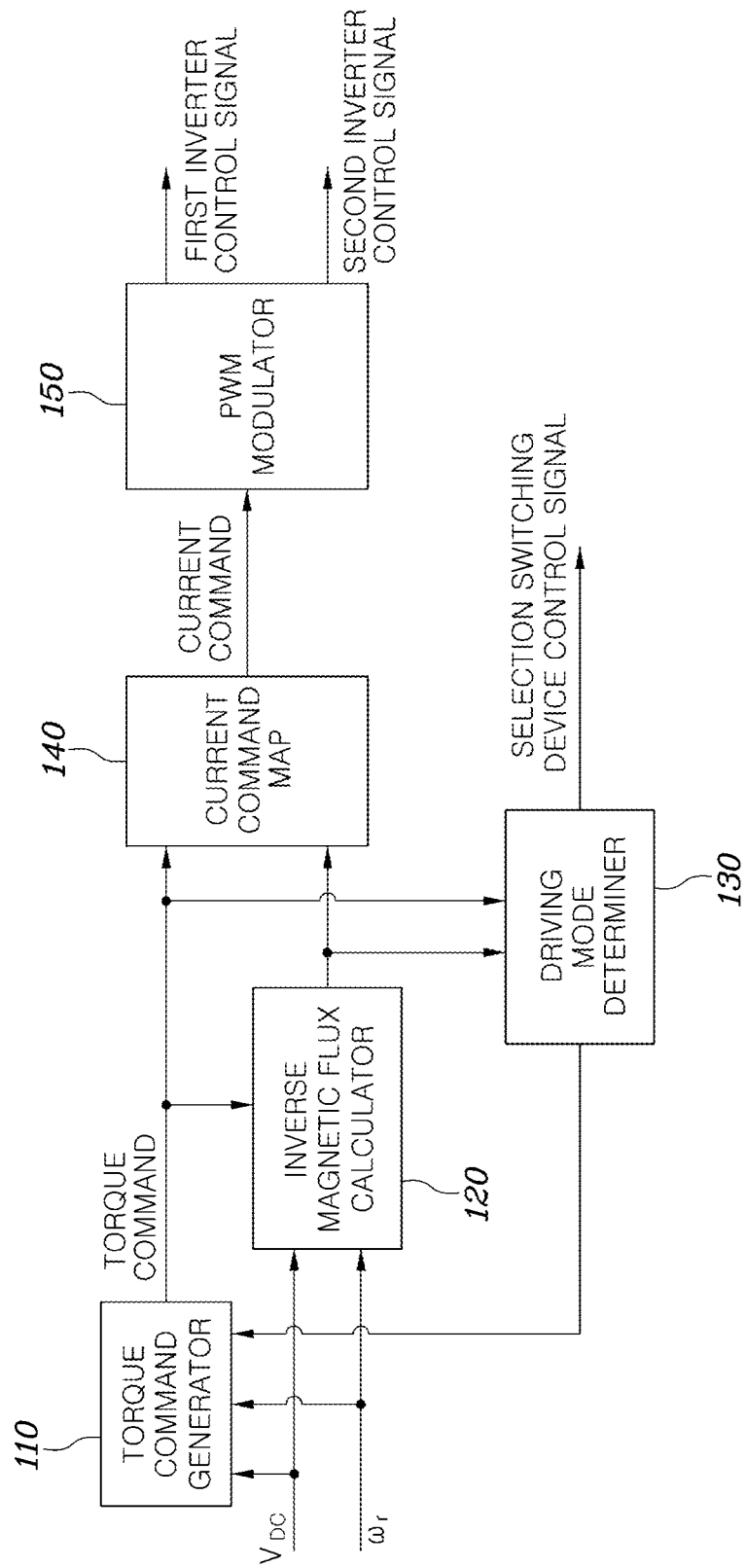
FIG. 2 is a block diagram showing the configuration of a controller of a motor driving apparatus according to various exemplary embodiments of the present invention.

FIG. 2 is a block diagram showing the configuration of a controller of a motor driving apparatus according to various exemplary embodiments of the present invention.

Referring to FIG. 2, the controller 100 of the motor driving apparatus according to various exemplary embodiments of the present invention may include a torque command generator 110 including an output map including data of a relationship between a torque and rotation speed of the motor, which is predetermined for each voltage, and for generating a torque command based on the output map by applying the received battery voltage $V_{DC}$ and the motor rotation speed $\omega_r$ to the output map, an inverse magnetic flux calculator 120 for determining inverse magnetic flux of the motor based on the torque command of the motor, the battery voltage $V_{DC}$, and the required rotation speed $\omega_r$, and a driving mode determiner 130 for determining a driving mode of the motor 40 based on the torque command of the motor and the inverse magnetic flux of the motor, determined by the inverse magnetic flux calculator 120.

The controller 100 may further include a current command map 140 for generating a current command of the motor 40 based on the torque command the inverse magnetic flux value, and a pulse width modulation (PWM) modulator 150 for PWM-controlling the states of switching devices in the inverters 10 and 20 based on the generated current command.

Figure 3:
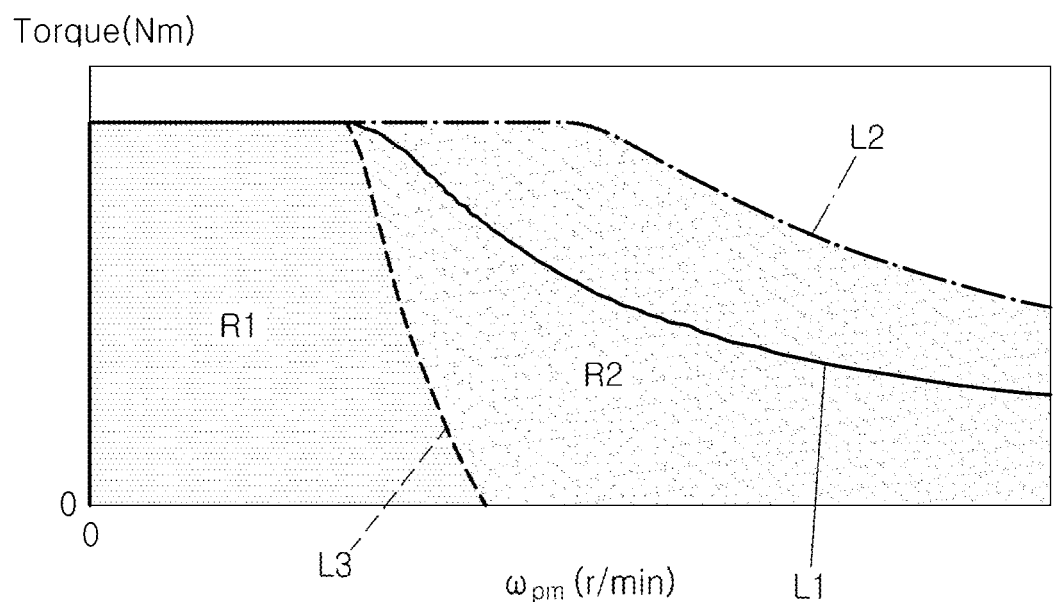
FIG. 3 is a diagram showing an example of an output map of a motor included in a controller of a motor driving apparatus according to various exemplary embodiments of the present invention.

FIG. 3 is a diagram showing an example of an output map of a motor included in a controller of a motor driving apparatus according to various exemplary embodiments of the present invention.

The torque command generator 110 of the controller 100 may include an output map as shown in FIG. 3. The output map may be a data map that determines the magnitude of torque to be output for each rotation speed of a motor in advance and storing the same and may be provided for each of a plurality of predetermined representative voltages among voltages to be output by the battery 200.

As shown in FIG. 3, when the motor 40 is driven in an OEW driving mode and a CEW driving mode, the output characteristic of the motor 40 may be changed, and thus the maximum torque for each rotation speed of a motor may be differently determined as shown in two curves L1 and L2. Various exemplary embodiments of the present invention may be provided to determine a motor driving mode, and a motor may be driven in different modes respectively in two regions R1 and R2 that are separated based on a curve L3 shown in FIG. 3. For example, the motor 40 may be driven in the CEW driving mode in a first region R1, and the motor 40 may be driven in the OEW driving mode in a second region R2.

As seen from FIG. 3, the curve L3 which is the reference for determining a motor driving mode may be formed in a region indicating a rotation speed and torque, which is lower than a curve indicating the maximum torque to be output in the CEW driving mode. This is because the reference curve L3 is determined by selecting a driving mode indicating lower loss of a motor in consideration of loss of the motor in a region in which both the two driving modes are used.

A method of determining the reference curve L3 for driving the motor 40 will be described below in more detail.

The torque command generator 110 may include the output map of a motor shown in FIG. 3 for each representative voltage to be output by the battery 200, and may generate a torque command based on a depression degree of an accelerator pedal corresponding to the battery voltage $V_{DC}$, the motor rotation speed $\omega_r$, and driver's required torque.

The inverse magnetic flux calculator 120 may determine the inverse magnetic flux of the motor 40, which is currently driven, based on the battery voltage $V_{DC}$ and the motor rotation speed $\omega_r$. The inverse magnetic flux of the motor 40 may be achieved using a mathematical expression for deriving an inverse magnetic flux, which is well-known in the art to which various exemplary embodiments of the present invention pertains. It is known that the inverse magnetic flux of the motor 40 is proportional to the motor rotation speed $\omega_r$ and is inversely proportional to the battery voltage $V_{DC}$, which may be represented according to Equation 1 below.

$$\frac{1}{\lambda} = \frac{\omega_r}{60} \times 2\pi \times 4\sqrt{3} \times \frac{1}{V_{DC}} \qquad \text{[Equation 1]}$$

In Equation 1 above, '1/λ' may be an inverse magnetic flux.

The voltage $V_{DC}$ of the battery 200 may be detected by a voltage sensor provided at a battery output end, and the rotation speed of the motor 40 may be determined based on the position of a rotor, detected by a rotor position detection sensor such as a resolver or a Hall effect sensor included in a motor. Voltage detection and rotation speed detection are well known in the art to which various exemplary embodiments of the present invention pertains, and thus a detailed description thereof with reference to a separate drawing is omitted.

The driving mode determiner 130 may determine a driving mode based on the torque command generated by the torque command generator 110 and the inverse magnetic flux value of the motor 40 generated by the inverse magnetic flux calculator 120.

The driving mode of the motor 40 may be determined through a preset torque-inverse magnetic flux relationship data map.

The driving mode determiner 130 may determine a driving mode to control on/off states of the selection switching devices S31 to S33 and may determine a motor output map for generating the torque command by the torque command generator 110.

Hereinafter, a method of making a torque-inverse magnetic flux relationship map used to determine a motor driving mode by the driving mode determiner 130 will be described.

The torque-inverse magnetic flux relationship map used to determine a motor driving mode may be made by applying an experimental method in advance, driving the motor 40 to extract motor-related data, and writing a data map for determining a motor driving mode based on the motor-related data.

Figure 4:
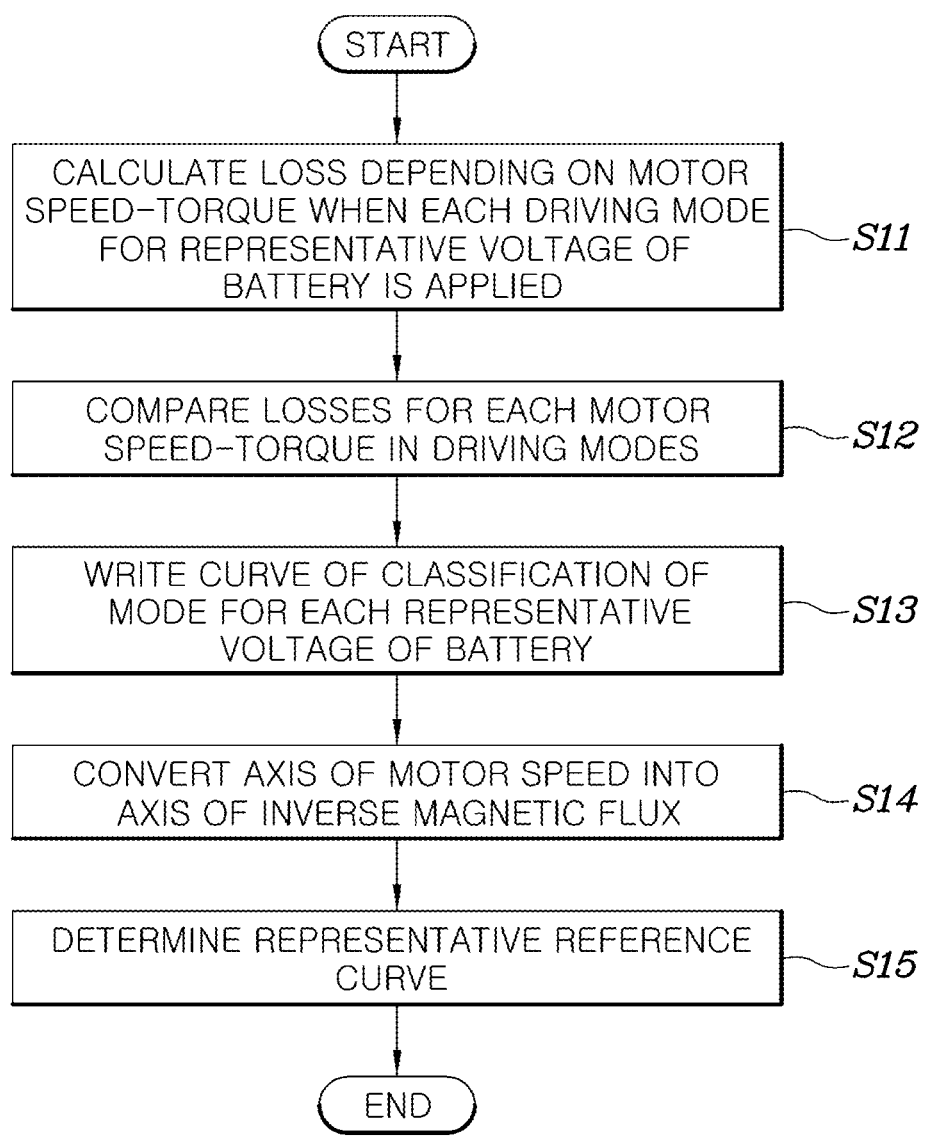
FIG. 4 is a flowchart showing a method of deriving a torque-inverse magnetic flux reference curve for determining a driving mode of a motor by a motor driving apparatus according to various exemplary embodiments of the present invention.
Figure 6:
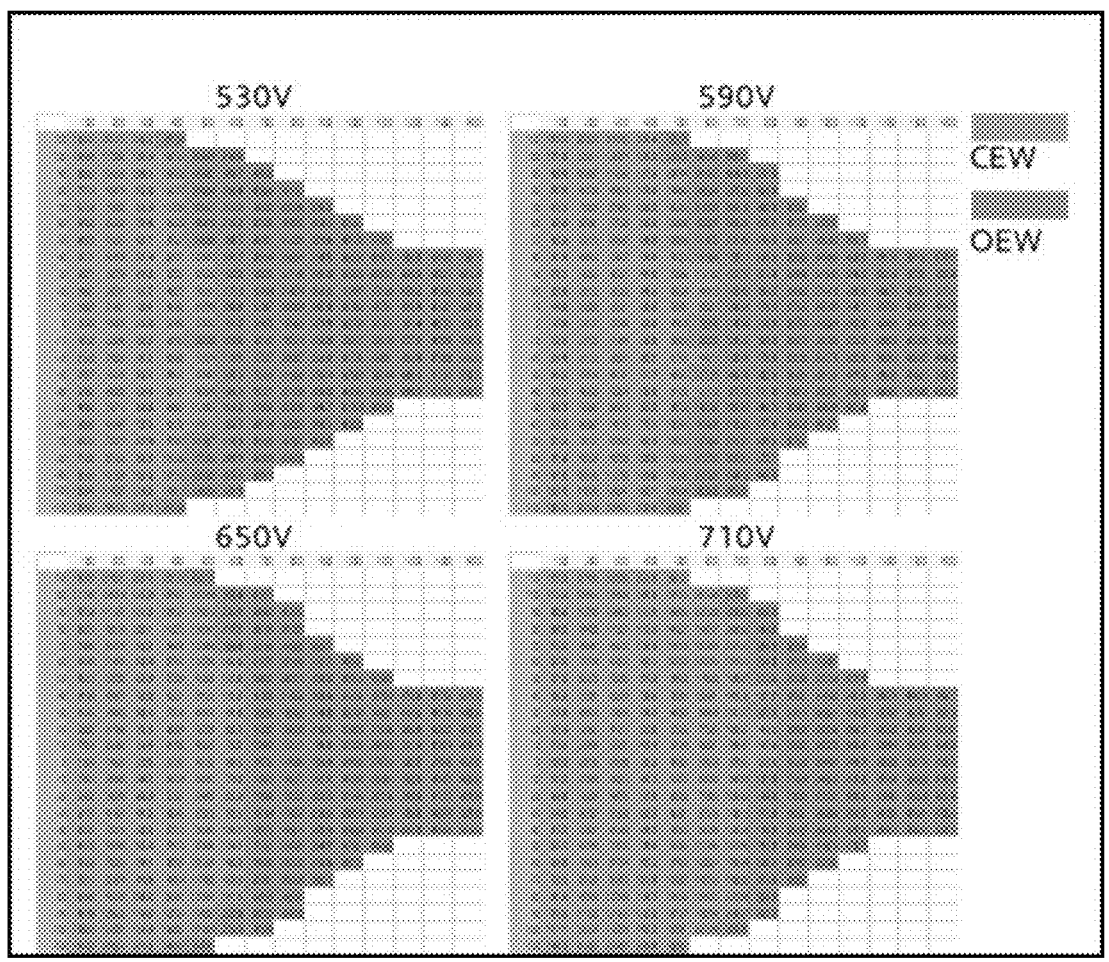
FIG. 6 is a diagram showing an example of classification of a motor driving mode for each representative voltage which is determined by comparing the losses shown in FIG. 5 for the representative voltages and selecting a driving mode having a smaller loss.

FIG. 4 is a flowchart showing a method of deriving a torque-inverse magnetic flux reference curve for determining a driving mode of a motor by a motor driving apparatus according to various exemplary embodiments of the present invention. FIG. 5 is a diagram showing an example in which motor losses are determined according to motor rotation speed and torque for each motor driving mode in a representative voltage of a battery. FIG. 6 is a diagram showing an example of classification of a motor driving mode for each representative voltage which is determined by comparing the losses shown in FIG. 5 for the representative voltages and selecting a driving mode having a smaller loss.

Referring to FIG. 4, first, motor loss according to a motor rotation speed-torque relationship may be derived while the motor 40 is driven in two driving modes for each representative voltage (S11). Motor loss may refer to a difference between energy input to a motor and output energy and may be derived using various methods that are known in the art to which various exemplary embodiments of the present invention pertains.

An example of motor loss according to a motor rotation speed-torque relationship for each of the two driving mode of the motor, derived in operation S11, is shown in FIG. 5. As shown in FIG. 5, motor loss values according to a motor rotation speed-torque relationship may be derived for each representative voltage in the two driving modes.

Accordingly, a motor driving mode for each motor speed-torque may be determined by comparing motor losses according to motor speed-torque of each driving mode for representative voltages and selecting a driving mode having a smaller loss (S12).

In operation S12, the magnitudes of losses determined in the same motor rotation speed-torque of each driving mode may be compared with each other, and a driving mode having a smaller loss may be determined as a driving mode in the corresponding motor rotation speed-torque.

An example of a motor mode determined in a motor rotation speed-torque relationship for respective representative voltages using the present method is shown in FIG. 6.

Figure 7:
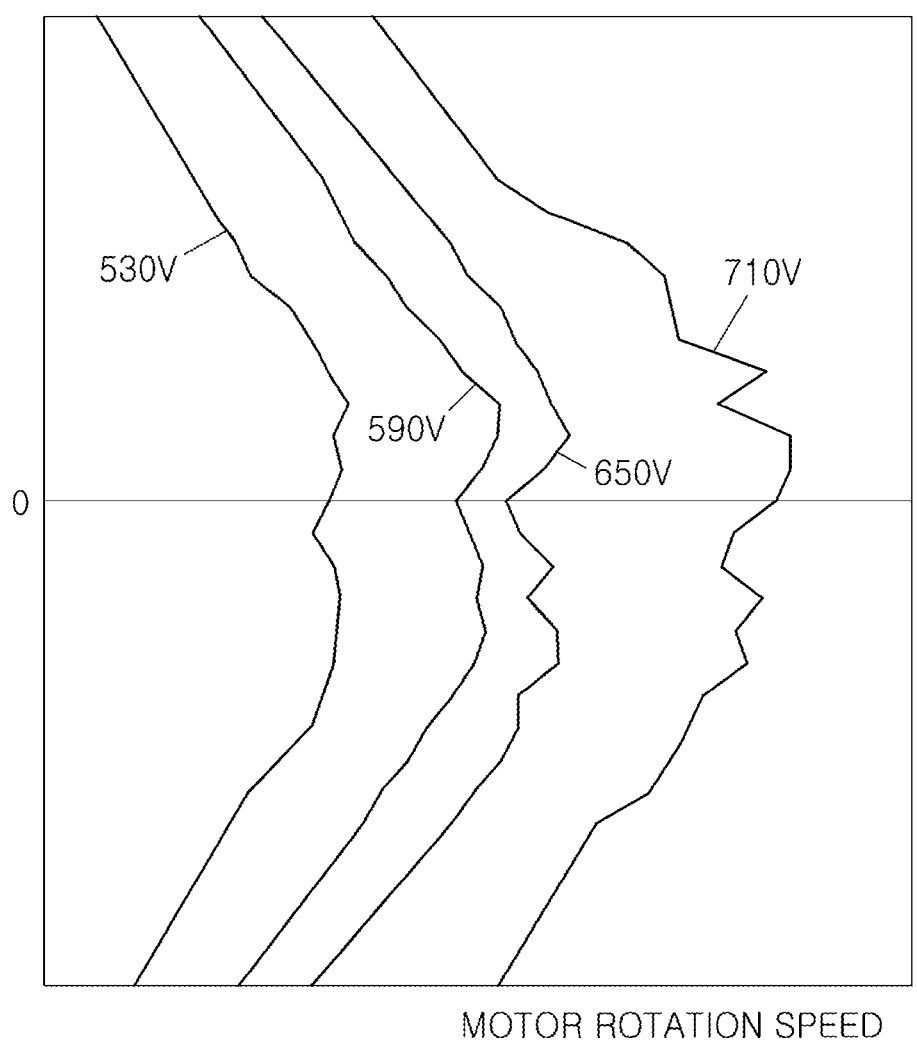
FIG. 7 shows curves of classification of a motor driving mode based on relationship between rotation speed and torque of the motor for each representative voltage.
Figure 8:
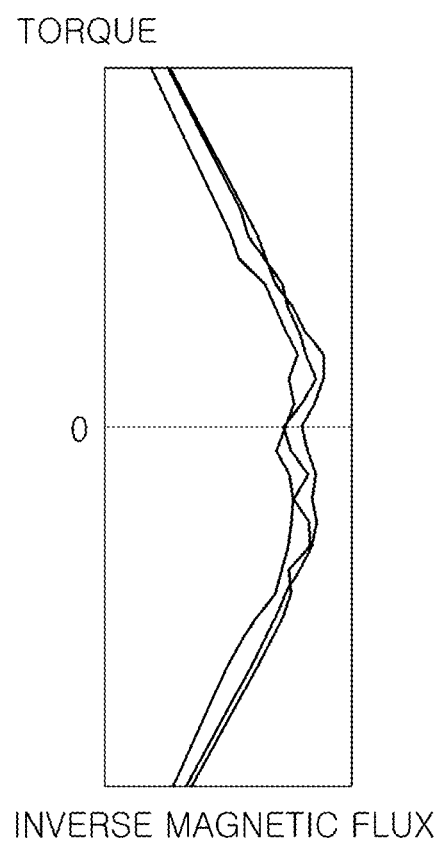
FIG. 8 is a diagram showing an example in which an axis of a motor rotation speed of FIG. 7 is converted into an axis of an inverse magnetic flux.
Figure 9:
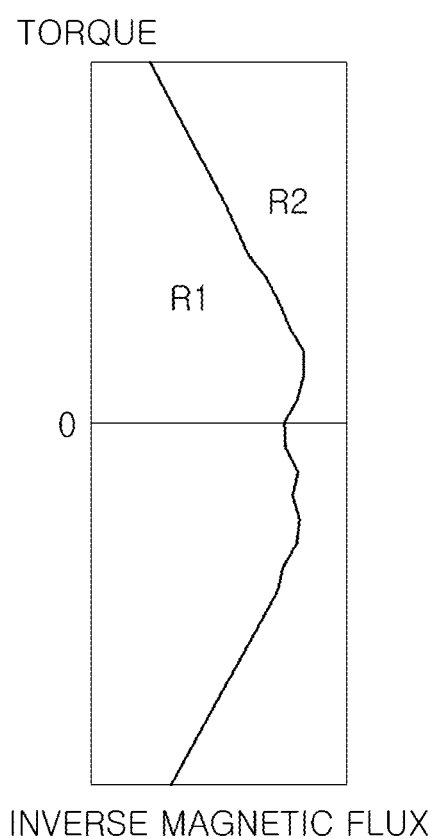
FIG. 9 shows a torque-inverse magnetic flux reference curve for determining the motor driving mode determined based on the curve of FIG. 8.

FIG. 7 shows curves of classification of a motor driving mode based on motor rotation speed-torque for each representative voltage. FIG. 8 is a diagram showing an example in which an axis of a motor rotation speed of FIG. 7 is converted into an axis of an inverse magnetic flux. FIG. 9 shows a torque-inverse magnetic flux reference curve for determining the motor driving mode determined based on the curve of FIG. 8.

A boundary of two motor driving modes determined for each representative voltage using the method shown in operation S12 may be indicated as a curve for classifying the two motor driving modes for each representative voltage as shown in FIG. 7.

As shown in FIG. 7, a classification curve corresponding to a boundary of the two driving modes may be derived for each representative voltage (S13), and when an axis of a motor rotation speed of FIG. 7 is converted into an axis of an inverse magnetic flux using Equation 1 above, a plurality of curves adjacent to each other may be achieved as shown in FIG. 8 (S14).

One reference curve shown in FIG. 9 may be determined by applying a weight (the sum of all weights is 1) based on a representative voltage to an inverse magnetic flux for each motor torque and summing the result values with respect to the motor torque-inverse magnetic flux classification curve derived for each of a plurality of representative voltages shown in FIG. 8 (S15).

When a driving state of a motor indicates a motor torque-inverse magnetic flux corresponding to a first region of the reference curve, the driving mode determiner 130 may determine the motor to be driven in a CEW driving mode, and when the driving state of the motor indicates a motor torque-inverse magnetic flux corresponding to a second region of the reference curve, the driving mode determiner 130 may determine the motor to be driven in an OWE driving mode.

That is, the driving mode determiner 130 may include a data map for classifying a torque-inverse magnetic flux region of a motor into two regions as shown in FIG. 9, and may determine a motor driving mode as one of the OEW driving mode and the CEW driving mode depending on the received torque command a region in which the motor inverse magnetic flux value is positioned.

Figure 10:
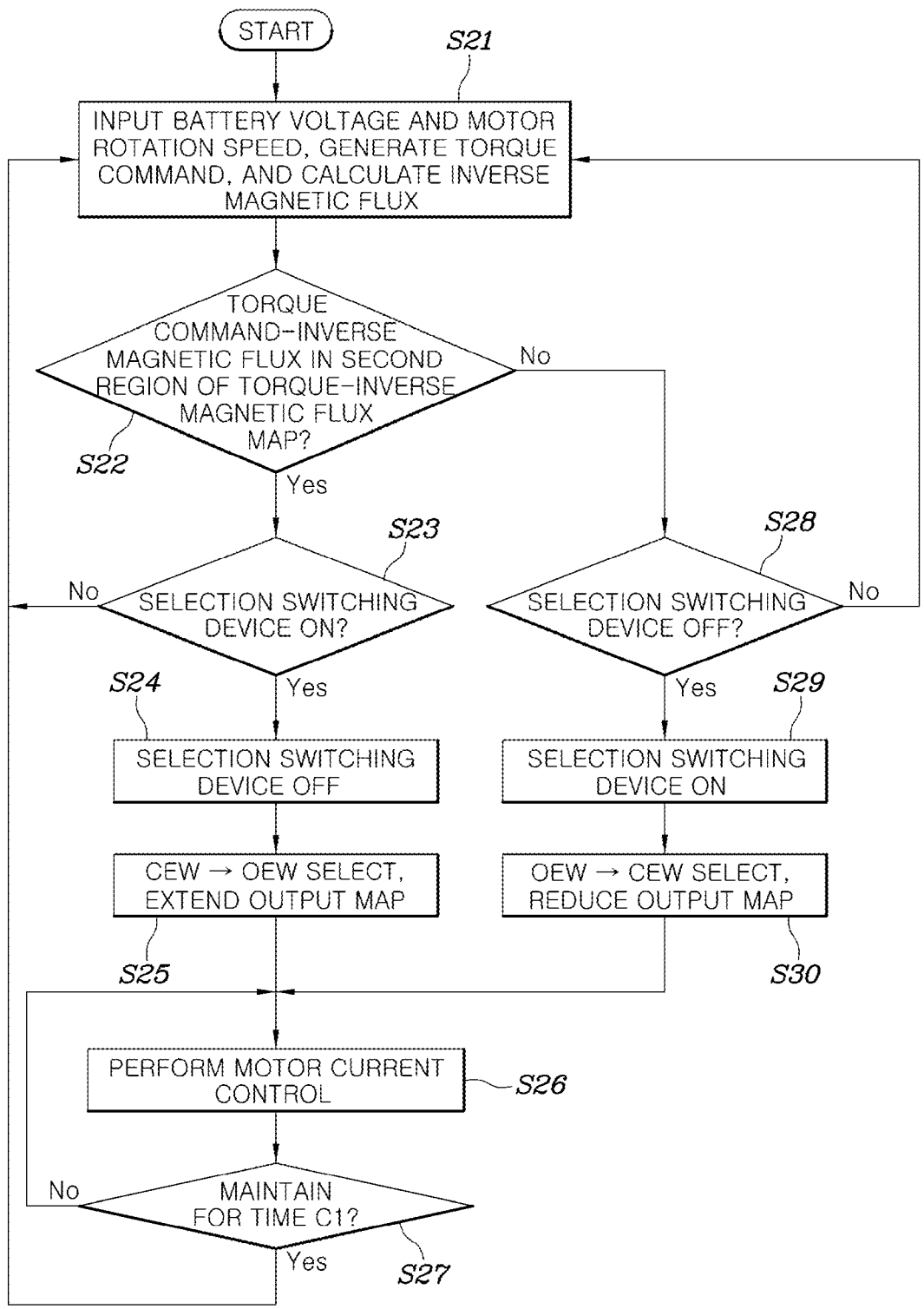
FIG. 10 is a diagram showing a motor driving method according to various exemplary embodiments of the present invention.

FIG. 10 is a diagram showing a motor driving method according to various exemplary embodiments of the present invention.

Referring to FIG. 10, the motor driving method according to various exemplary embodiments of the present invention may be start from operation S21 in which the controller 100 receives the battery voltage $V_{DC}$ and the rotation speed $\omega_r$ of the motor 40, the torque command generator 110 for generating a torque command by applying the battery voltage $V_{DC}$, rotation speed $\omega_r$ of the motor 40, and a driver input to a predetermined and stored motor output map, and the inverse magnetic flux calculator 120 determines the inverse magnetic flux of the motor based on the battery voltage $V_{DC}$ and the rotation speed $\omega_r$ of the motor 40.

Accordingly, the driving mode determiner 130 may determine a region to which a torque command and an inverse magnetic flux value belong using a torque-inverse magnetic flux data map for determining a mode, which is preset using the torque command the inverse magnetic flux value (S22).

When the driving mode determiner 130 determines a region to which the torque command the inverse magnetic flux value belong as the second region R2 (i.e., a region in which a motor is determined to be driven in an OEW driving mode), if a selection switching device is already turned off, the motor already becomes in the state in which the motor is driven in the OEW driving mode, and the method may return to operation S21 and whether a driving mode needs to be selected may be monitored (S23).

In operation S23, when the selection switching device is turned on, the driving mode determiner 130 may turn off the selection switching device (S24) and may notify the torque command generator 110 that a driving mode of the motor is changed to an OEW driving mode (S25).

In operation S25, the torque command generator 110 may extend an output map that has been used in the CEW driving mode to be applied in the OEW driving mode. That is, an output map having a boundary of the same maximum torque as the curve L1 of FIG. 3 may be extended to an output map having a boundary of the same maximum torque as the curve L2.

Accordingly, the current command map 140 may receive a torque command an inverse magnetic flux value and may output a current command corresponding to the torque command the inverse magnetic flux value. The current command map 140 may be a data map in which the current command corresponding to the torque command the inverse magnetic flux value is stored in advance using an experimental method.

The PWM modulator 150 may generate and output a first inverter control signal and a second inverter control signal for PWM control of the switching devices S11 to S16 and S21 to S26 in a first inverter 10 and a second inverter 20 by applying a preset PWM modulation method to apply current corresponding to the received current command to a motor (S26).

A method of generating a current command using a current command map and PWM-controlling a switching device of an inverter using a current command map is well known in the art to which various exemplary embodiments of the present invention pertains and a detailed description thereof is omitted.

Motor current control after a motor driving mode is changed may continue for a preset minimum reference time C1, and when the minimum reference time C1 elapses, the method may return to operation S21 and a procedure of checking whether a driving mode needs to be selected may be performed (S27). This is because the stability of motor control needs to be prevented from being degraded when a motor driving mode is frequently changed within a short time.

In operation S22, when determining that a region to which the torque command the inverse magnetic flux value belong is the first region R1 but not the second region R2, the driving mode determiner 130 may determine the driving mode of the motor as the CEW driving mode.

When the driving mode determiner 130 determines the motor to be driven in the CEW driving mode, if a selection switching device is already turned on, the motor already becomes in the state in which the motor is driven in the CEW driving mode, the method may return to operation S21 and whether a driving mode needs to be selected may be monitored (S28).

In operation S28, when the selection switching device is turned off, the driving mode determiner 130 may turn on the selection switching device (S29) and may notify the torque command generator 110 that a driving mode of the motor is changed to a CEW driving mode (S30).

In operation S30, the torque command generator 110 may reduce an output map that has been used in the OEW driving mode to be applied in the CEW driving mode. That is, an output map having a boundary of the same maximum torque as the curve L2 of FIG. 3 may be extended to an output map having a boundary of the same maximum torque as the curve L1.

As described above, the motor driving apparatus and method according to various embodiments of the present invention may apply a data map for determining whether an OEW driving mode and a CEW driving mode are applied in consideration of motor loss depending on a motor torque-rotation speed relationship, and thus the efficiency of the motor may be maximized and the motor may be driven. The motor driving apparatus and method according to various embodiments of the present invention may derive a plurality of inverse magnetic flux values based on a voltage to be output by a battery for providing power of the motor and may write data map for selecting a motor driving mode based on a representative inverse magnetic flux value obtained by applying a weight to the plurality of inverse magnetic flux values, and thus the amount of data of the data map may be reduced, reducing computational load for control.

The motor driving apparatus and method may apply data map for determining whether an OEW driving mode and a CEW driving mode are applied in consideration of motor loss depending on a motor torque-rotation speed relationship, and thus the efficiency of the motor may be maximized and the motor may be driven.

The motor driving apparatus and method may derive a plurality of inverse magnetic flux values based on a voltage to be output by a battery for providing power of the motor and may write a data map for selecting a motor driving mode based on a representative inverse magnetic flux value obtained by applying a weight to the plurality of inverse magnetic flux values, and thus the amount of data of the data map may be reduced, reducing computational load for control.

It will be appreciated by persons skilled in the art that the effects that could be achieved with the present invention are not limited to what has been described hereinabove and other advantages of the present invention will be more clearly understood from the detailed description.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A motor driving apparatus comprising:
    a first inverter circuit including a plurality of first switching devices and connected to a first end portion of each of a plurality of windings in a motor corresponding to a plurality of phases of the motor, respectively;
    a second inverter circuit including a plurality of second switching devices and connected to a second end portion of each of the plurality of windings;
    a plurality of selection switching devices having first end portions connected to a node to which the plurality of windings and the plurality of second switching devices are connected and second end portions connected to each other; and
    a controller electrically connected to the plurality of first switching devices, the plurality of second switching devices and the plurality of selection switching devices,
    wherein the controller is configured to drive the motor in one driving mode among a plurality of driving modes including a first driving mode in which the plurality of selection switching devices is turned on by the controller and the first switching device is controlled by the controller to drive the motor and a second driving mode in which the plurality of selection switching devices is turned off by the controller and the first switching device and the second switching device are controlled by the controller to drive the motor, and
    wherein the controller is configured to determine the one driving mode according to an inverse magnetic flux value and a torque command of the motor.

2. The motor driving apparatus of claim 1,
    wherein the controller includes an output map applied to each of the first driving mode and the second driving mode, and
    wherein the output map stores torque of the motor depending on a rotation speed of the motor for each voltage of a battery that stores electric power of the motor.

3. The motor driving apparatus of claim 2, wherein the controller is configured to generate the torque command of the motor by applying the voltage of the battery, the rotation speed of the motor, and a driver input to the output map.

4. The motor driving apparatus of claim 1, wherein the controller includes a data map for determining the driving modes according to the inverse magnetic flux value and the torque command of the motor and is configured to determine the one driving mode of the motor according to a region corresponding to the inverse magnetic flux value and the torque command of the motor in the data map for determining the one driving mode.

5. The motor driving apparatus of claim 4, wherein the controller is configured to determine an inverse magnetic flux of the motor according to a rotation speed of the motor for each voltage of a battery that stores electric power of the motor, and is configured to determine the one driving mode of the motor by applying the determined inverse magnetic flux of the motor and the torque command of the motor to the data map for determining the one driving mode.

6. The motor driving apparatus of claim 4, wherein the data map for determining the driving modes is a data map configured by deriving a loss of the motor in advance according to relationship between rotation speed and torque of the motor in each driving mode for each of a plurality of voltages of a battery that stores electric power of the motor, determining a driving mode having a smaller loss in advance among losses in relationship between rotation speed and torque of the motor that correspond to each other as a driving mode in a corresponding relationship between rotation speed and torque of the motor, deriving a boundary of a driving mode in the relationship between rotation speed and torque of the motor determined for each voltage of the battery, converting an axis of a rotation speed of the boundary into an axis of the inverse magnetic flux, and setting a region for determining the one driving mode of the motor according to a reference curve determined by applying a weight to an inverse magnetic flux in each torque for each of a plurality of voltages, summing result values, and connecting representative inverse magnetic fluxes depending on the torque.

7. The motor driving apparatus of claim 1, wherein the controller is configured to generate and output a first inverter control signal and a second inverter control signal for pulse width modulation (PWM) control of the plurality of first switching devices and the plurality of second switching devices in the first inverter and the second inverter respectively, to apply current corresponding to a current command determined according to the inverse magnetic flux value and the torque command of the motor to the motor.

8. The motor driving apparatus of claim 7, wherein, when the one driving mode of the motor is changed, the controller is configured to maintain the changed one driving mode of the motor for a predetermined reference time and then to determine whether the one driving mode of the motor is changed.

9. A motor driving method using a motor driving apparatus including a first inverter circuit including a plurality of first switching devices and connected to a first end portion of each of a plurality of windings in a motor corresponding to a plurality of phases of the motor respectively, a second inverter circuit including a plurality of second switching devices and connected to a second end portion of each of the plurality of windings, and a plurality of selection switching devices having first end portions connected to a node to which the plurality of windings and the plurality of second switching devices are connected and second end portions connected to each other, the motor driving method comprising:

receiving, by a controller electrically connected to the plurality of first switching devices, the plurality of second switching devices and the plurality of selection switching devices, a rotation speed of the motor and a voltage of a battery that stores electric power of the motor;

generating, by the controller, a torque command of the motor and determining an inverse magnetic flux value of the motor according to the received rotation speed of the motor and the voltage of the battery;

applying, by the controller, the determined torque command and the inverse magnetic flux value to a preset data map for determining a plurality of driving modes including a first driving mode and a second driving mode and determining one driving mode of the motor from the first driving mode in which the plurality of selection switching devices is turned on by the controller and the first switching device is controlled by the controller to drive the motor and the second driving mode in which the plurality of selection switching devices is turned off by the controller and the first switching device and the second switching device are controlled by the controller to drive the motor; and controlling, by the controller, an on/off state of the plurality of selection switching devices according to the determined one driving mode of the motor and controlling the first switching device and the second switching device.

10. The motor driving method of claim 9, wherein the controller is configured to determine the torque command using an output map for storing torque according to a rotation speed of the motor for each voltage of the battery to be applied to the first driving mode and the second driving mode.

11. The motor driving method of claim 10, wherein the controller is configured to generate the torque command of the motor by applying the voltage of the battery, the rotation speed of the motor, and a driver input to the output map and generating the torque command of the motor.

12. The motor driving method of claim 9, wherein the controller is configured to determine the inverse magnetic flux of the motor according to the rotation speed of the motor for each voltage of the battery that stores the electric power of the motor.

13. The motor driving method of claim 9, wherein the data map for determining the plurality of driving modes is a data map configured by deriving a loss of the motor in advance according to relationship between rotation speed and torque of the motor in each driving mode for each of a plurality of voltages of the battery that stores the electric power of the motor, determining a driving mode having a smaller loss in advance among losses in relationship between rotation speed and torque of the motor that correspond to each other as a driving mode in a corresponding motor rotation speed-torque, deriving a boundary of a driving mode in the relationship between rotation speed and torque of the motor determined for each voltage of the battery, converting an axis of a rotation speed of the boundary into an axis of the inverse magnetic flux, and setting a region for determining the driving mode of the motor according to a reference curve determined by applying a weight to an inverse magnetic flux in each torque for each of a plurality of voltages, summing result values, and connecting representative inverse magnetic fluxes depending on torque.

14. The motor driving method of claim 9, wherein the controller is configured to generate and output a first inverter control signal and a second inverter control signal for pulse width modulation (PWM) control of the plurality of first switching devices and the plurality of second switching devices in the first inverter and the second inverter respectively, to apply current corresponding to a current command determined according to the inverse magnetic flux value and the torque command of the motor to the motor.

15. The motor driving method of claim 14, wherein, when the one driving mode of the motor is changed, the one driving mode of the motor is determined again by performing the receiving, the determining of the inverse magnetic flux value of the motor according to the received rotation speed of the motor and the voltage of the battery, and the determining after the one changed driving mode of the motor is maintained for a predetermined reference time.

16. A non-transitory computer readable storage medium on which a program for performing the motor driving method of claim 9 is recorded.

* * * * *